(12) United States Patent
Hartwell

(10) Patent No.: US 7,823,633 B2
(45) Date of Patent: Nov. 2, 2010

(54) VALVE APPARATUS

(76) Inventor: Mark David Hartwell, 52 Fenwood Close, Sylvan Lake, AB (CA) T4S 2K4

( * ) Notice: Subject to any disclaimer, the term of this patent is extended or adjusted under 35 U.S.C. 154(b) by 0 days.

(21) Appl. No.: 12/566,755

(22) Filed: Sep. 25, 2009

(65) Prior Publication Data

US 2010/0012872 A1   Jan. 21, 2010

Related U.S. Application Data

(63) Continuation-in-part of application No. 11/869,167, filed on Oct. 9, 2007, now abandoned.

(30) Foreign Application Priority Data

Oct. 9, 2008   (CA) .................................. 2641707

(51) Int. Cl.
*E21B 34/14* (2006.01)
*F16K 31/12* (2006.01)

(52) U.S. Cl. ................ 166/66.6; 166/334.1; 251/30.02; 251/30.05; 251/33; 251/38

(58) Field of Classification Search ............. 166/332.1, 166/66.6, 334.1; 251/30.02, 30.05, 33, 38
See application file for complete search history.

(56) References Cited

U.S. PATENT DOCUMENTS

| | | | | |
|---|---|---|---|---|
| 2,771,062 A * | 11/1956 | Hayner | ..................... | 251/30.02 |
| 2,968,464 A * | 1/1961 | Olson | ..................... | 251/30.04 |
| 3,381,751 A * | 5/1968 | McLelland | ................. | 166/66.4 |
| 4,129,184 A * | 12/1978 | Parker | ........................ | 166/385 |
| 5,000,220 A * | 3/1991 | Eick et al. | ................... | 137/501 |
| 5,234,057 A * | 8/1993 | Schultz et al. | .............. | 166/319 |
| 5,279,363 A * | 1/1994 | Schultz et al. | ................ | 166/53 |
| 5,893,413 A * | 4/1999 | Lembcke et al. | .......... | 166/66.6 |
| 6,041,857 A * | 3/2000 | Carmody et al. | .......... | 166/66.4 |
| 6,722,439 B2 * | 4/2004 | Garay et al. | ................ | 166/373 |
| 6,768,700 B2 | 7/2004 | Veneruso et al. | | |
| 6,957,699 B2 * | 10/2005 | Feluch et al. | ............... | 166/184 |
| 7,114,697 B2 | 10/2006 | Miller et al. | | |
| 7,337,847 B2 * | 3/2008 | McGarian et al. | ........ | 166/334.4 |
| 7,337,850 B2 * | 3/2008 | Contant | ..................... | 166/375 |
| 7,575,058 B2 * | 8/2009 | Franco et al. | ............ | 166/334.4 |
| 2005/0230119 A1* | 10/2005 | McGarian et al. | ........ | 166/334.4 |
| 2006/0225885 A1* | 10/2006 | Mcgarian et al. | ......... | 166/334.4 |
| 2007/0056745 A1* | 3/2007 | Contant | ..................... | 166/382 |

* cited by examiner

*Primary Examiner*—Jennifer H Gay
(74) *Attorney, Agent, or Firm*—Kyle R. Satterthwaite; Ryan W. Dupuis; Ade & Company Inc.

(57) ABSTRACT

A valve apparatus for controlling fluid flow between a fluid passage and a fluid delivery conduit therein includes a valve housing having first and second housing ports spaced therealong, and a driven member driveable toward and away from the first housing port. A closure member having a port is coupled to the driven member and slidable therealong. The driven member and closure member close and open the closure member port during movement of the driven member toward and away from the first port to induce and relieve a pressure differential, exerted on the closure member by fluid entering the housing, acting to slide the closure member along the driven member to close the first housing port. An inductive coil extends about an open end of the housing to receive a coil-equipped end of a probe therein to communicate the probe with monitoring and control systems across the valve.

20 Claims, 14 Drawing Sheets

VALVE APPARATUS

This application is a continuation-in-part of U.S. application Ser. No. 11/869,167, filed Oct. 9, 2007, and claims foreign priority benefits from Canadian Patent Application No. 2,641,707 filed Oct. 9, 2008.

FIELD OF THE INVENTION

The present invention relates generally to valves, and more particularly to valves of the type arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit.

BACKGROUND OF THE INVENTION

Drawdown and build-up tests are often performed on production and injection wells at regular intervals to monitor the performance of the producing formations in the well. A typical test set-up usually includes a down hole valve (shut in tool) which is placed in the well and manipulated by slick line. There is usually a pressure recording device below the valve which records the pressure response of the formation being tested as the vale is opened or closed. The formation is allowed to flow for a sufficient length of time to insure that it is drawn down to a desired level. After this draw down period is complete, the shut in valve is used to shut in the well. The formation pressure is allowed to build up for a sufficient period of time to allow it to reach a desired level, before another draw down period is started. The entire process is then sometimes repeated immediately to acquire more pressure data from another drawdown/build-up test.

Shut in valves of the prior art have been actuated by mechanical means and electrical means. Mechanical actuators can be lowered on a slickline to operate such valves. Conversely, designs exist which use an electrical motor and controlling circuit to open and close down hole valves.

U.S. Pat. No. 3,587,735 of Owen is an early shut-in tool patent teaching a valve that is mechanical and must be operated, opened and closed, using slick line.

U.S. Pat. No. 5,234,057 owned by the Halliburton Company details the use of an electronic timing circuit and motor to open and close a down hole shut in tool automatically. Not having to use a slick line truck to open and close the valve reduces costs to the service company.

U.S. Pat. No. 6,957,699 owned by Stellar Tech Energy Services Inc. uses a similar timing circuit as Halliburton, this patents details an improved valve apparatus. The valve apparatus uses a ball and seat to seal. The valve also claims a quick close and equalization.

In U.S. Pat. No. 7,114,697 owned by GeoServices, again, an improved valve designed is mentioned. This spring loaded valve has a complicated latch and release mechanism to instantly close and re-open the valve.

Although the present invention is described primarily in the context of down-hole shut-in and injection tools for use within a wellbore, it should be appreciated that the disclosed apparatuses, the methods of use thereof, the valve configurations thereof, the valve drive mechanisms thereof, and related devices used therewith may be used in other applications requiring delivery of a fluid between an interior and exterior of a fluid passage via a pressure difference between the fluid passage and a fluid delivery conduit extending thereinto.

SUMMARY OF THE INVENTION

According to a first aspect of the invention there is provided a valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a valve housing having an open end and having a first housing port and a second housing port spaced along the valve housing, each port communicating an exterior and interior thereof, the valve housing being arranged for support within the fluid delivery conduit with a seal closing off space between the valve housing and the fluid delivery conduit to limit flow past the seal to flow passing through the open end of the housing;

a driven member supported within the housing;

a drive mechanism coupled to the driven member to effect displacement of the driven member along the housing toward and away from the first housing port into extended and retracted positions respectively; and a closure member slidably coupled to the driven member to be slidable along the housing relative to the driven member with the driven member between the extended and retracted positions, the closure member having a closure member port communicating an interior and exterior thereof;

the driven member and closure member arranged to close and open the closure member port during movement of the driven member toward the extended position and the retracted position respectively to respectively induce and relieve a pressure differential exerted on the closure member by fluid entering the housing to slide the closure member along the driven member to a closed position in which the closure member closes the first housing port.

Preferably the drive mechanism comprises an externally threaded shaft arranged for operative coupling with a motor and the driven member comprises an internally threaded piston coupled to the shaft for linear displacement therealong under driven rotation thereof by the motor.

Preferably stops defined between the closure member and the driven member at spaced apart positions therealong limit relative sliding therebetween to establish movement of the driven member and closure member together after a predetermined amount of relative sliding therebetween in a single direction from engagement with either stop.

An inner diameter of the housing and an outer diameter of the closure member each may be stepped to increase in size toward the first housing port to increase a surface area for pressure of the fluid entering the housing through the second housing port to act on toward the first housing port with the closure port closed by the driven member.

Alternatively an inner diameter of the housing and an outer diameter of the closure member each may be stepped to increase in size away from the first housing port to increase a surface area for pressure of the fluid entering the housing through the fluid delivery line to act toward the first housing port with the closure member port closed by the driven member. In this instance, the driven member preferably has a passage defined therethrough to allow fluid flow from the fluid delivery line through the driven member to exert pressure toward the first housing port at the surface area with the closure port closed by the driven member.

Preferably a sealing arrangement associated with the driven and closure members is defined within the housing and arranged to first close off the closure member port between the driven member and the closure member under movement of the driven member from the retracted position toward the toward the first housing port relative to the closure member and to subsequently close off the first housing port between the closure member and the housing under movement of the closure member toward the first housing port subsequent to closing of the closure member port.

Preferably the sealing arrangement comprises inner annular seals disposed about an external periphery of the driven member at spaced locations therealong to seal against the closure member and outer annular seals disposed about an external periphery of the closure member at spaced locations therealong to seal against the housing, the closure member comprising a sleeve disposed about the driven member, movement of the driven member to situate the closure member port between engagement of adjacent inner annular seals between the driven member and the closure member effecting closing of the closure member port and movement of the closure member to situate the first housing port between engagement of adjacent outer annular seals between the closure member and the housing effecting closing of the first housing port.

Preferably the closure member port is in fluid communication with the exterior of the housing through an opening in a wall of the housing with the driven member in the retracted position and the closure member port closed.

Preferably there is provided a stop defined between housing and closure member to prevent movement of the closure member past the closed position.

The housing may be arranged for support within production tubing of a wellbore for use of the valve apparatus as a shut-in valve for controlling flow of production fluid from the fluid passage defined by the wellbore through the fluid delivery conduit defined by the production tubing.

Alternatively, the housing may be arranged for support within injection tubing of a wellbore for use of the valve apparatus as an injection valve for controlling flow of injection fluid into the fluid passage defined by the wellbore through the fluid delivery conduit defined by the injection tubing.

Preferably the driven member is arranged to support the closure member in the closed position with the driven member deployed to the extended position.

According to a second aspect of the invention there is provided a valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a tubular valve housing having an open end and having a first housing port and a second housing port spaced along the valve housing, each port communicating an exterior and interior of the valve housing with the first housing port being adjacent the open end of the housing and the second housing port being on a side of the first housing port opposite the open end of the housing, the valve housing being arranged for support within the fluid delivery conduit with a seal closing off space between the valve housing and the fluid delivery conduit to limit flow past the seal to flow passing through the open end of the housing;

a driven member supported within the housing and comprising a piston displaceable therealong;

a drive mechanism coupled to the driven member within the housing on a side of the second housing port opposite the first housing port to effect displacement of the driven member along the housing toward and away from the first housing port into extended and retracted positions respectively; and a closure member comprising a sleeve disposed about and slidably coupled to the driven member for relative sliding between the closure member and the driven member along the housing, the closure member having a closure member port communicating an interior and exterior thereof;

an inner diameter of the housing changing in size at a step defined between the first and second housing ports and an outer diameter of the closure member changing in size at a corresponding step, the sliding of the closure member along the housing moving the steps toward and away from one another to close and open an annular space between the closure member and the housing, the step of the closure member increasing a surface area for pressure of the fluid entering the housing to act on toward the first housing port with the closure member port closed, closing of the closure member port acting to seal off the annular space from a remainder of the interior of the housing to create a pressure differential between the remainder of the housing interior and the annular space which is open to the housing exterior through the second housing port and opening of the closure member relieving the pressure differential, the pressure differential and the pressure of the fluid acting on the increased surface area acting to slide the closure member along the driven member to a closed position in which the closure member closes the first housing port;

driving of the driven member from the retracted position toward the extended position moving the driven member along the surrounding closure member to close off the closure member port to induce sliding of the closure member along the driven member into the closed position and driving of the driven member from the extended position toward the retracted position moving the driven member along the surrounding closure member to open the closure member port to facilitate withdrawal of the closure member from the closed position.

Preferably a stop is defined between the closure member and the drive member to engage the closure and drive members for movement together away from the first housing port after sufficient movement of the drive member from the extended position toward the retracted position with the closure member in the closed position to open the closure member port.

The inner diameter of the housing and the outer diameter of the closure member, across the step and the corresponding step respectively, may each increase in size toward the first housing port and the increased surface area is defined within the annular space with the pressure exerted on the increased surface area to force the closure member toward the first housing port being provided by fluid entering the annular space from the fluid passage through the second housing port.

Alternatively, the inner diameter of the housing and the outer diameter of the closure member, across the step and the corresponding step respectively, may each increase in size away from the first housing port and the increased surface area may be defined outside the annular space within the remainder of the housing interior on a side of the annular space opposite the first housing port with the pressure exerted on the increased surface area to force the closure member toward the first housing port being provided by fluid entering the remainder of the housing interior from the fluid delivery conduit through the open end of the housing, the driven member having a passage defined therethrough to allow the fluid from the delivery conduit to reach the increased surface area.

Like the aforementioned prior art shut-in valves, the valve apparatus can be controlled to open and close automatically, it closes instantly, and it can equalize and re-open. Being arranged to use existing differences in pressure, for example the pressure difference existing between the production fluid of a wellbore and the production string through which it is to be produced, the valve apparatus does not require complex mechanical systems to effect fast closing of the housing's first port. The valve apparatus should therefore be less expensive and more reliable.

According to a third aspect of the invention there is provided a down hole valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a valve housing having an open end and at least one port communicating an exterior and interior of the housing, the valve housing being arranged for support within the fluid delivery conduit with a seal closing off space between the valve housing and the fluid delivery conduit to limit flow past the seal to flow passing through the open end of the housing;

a valve operating mechanism supported within the housing and operable to open and close the at least one port to control fluid flow between the interior of the valve housing and the surrounding fluid passage;

an electronic system situated on a side of the valve operating mechanism opposite the open end of the valve housing; and an inductive coil electrically coupled to the electronic system, supported proximate the open end of the valve housing and wrapped about an axis thereof the inductive coil and the open end of the valve housing being sized to receive therein an end of a probe having a respective inductive coil wrapped about a respective axis thereof to facilitate inductive energy transfer between the inductive coils.

Preferably the electronic system comprises a control system coupled to the valve operating mechanism to control operation thereof in response to signals passed from the probe to the electronic system through the inductive coils.

Preferably the electronic system comprises a monitoring system arranged to monitor conditions within the fluid passage and send signals to the probe indicative of the conditions through the inductive coils.

BRIEF DESCRIPTION OF THE DRAWINGS

In the accompanying drawings, which illustrate exemplary embodiments of the present invention.

DETAILED DESCRIPTION OF THE PREFERRED EMBODIMENTS

A multi-cycle, instant close, down-hole shut-in tool includes a shuttle piston which when moved closes a relief port allowing a differential pressure to form across a sliding sleeve. This differential pressure forces a sliding sleeve in a direction which closes the valve. With or without a differential pressure present, the shuttle valve will continue to force the sliding sleeve in the correct direction to close the valve. This same shuttle piston has the ability to move in the opposite direction, in turn opening a relief port to remove the potential differential pressure across the sliding sleeve element and opening the valve. An electronic timer assembly and electric drive motor are provided for controlling the action of the shuttle piston. Two different sleeve profiles allow the valve to operate in both injection and production settings. An inductive coupler within the valve allows data from the controls circuit to be communicated to surface, and vice versa in real time.

Completion Summary

Figure 1A:
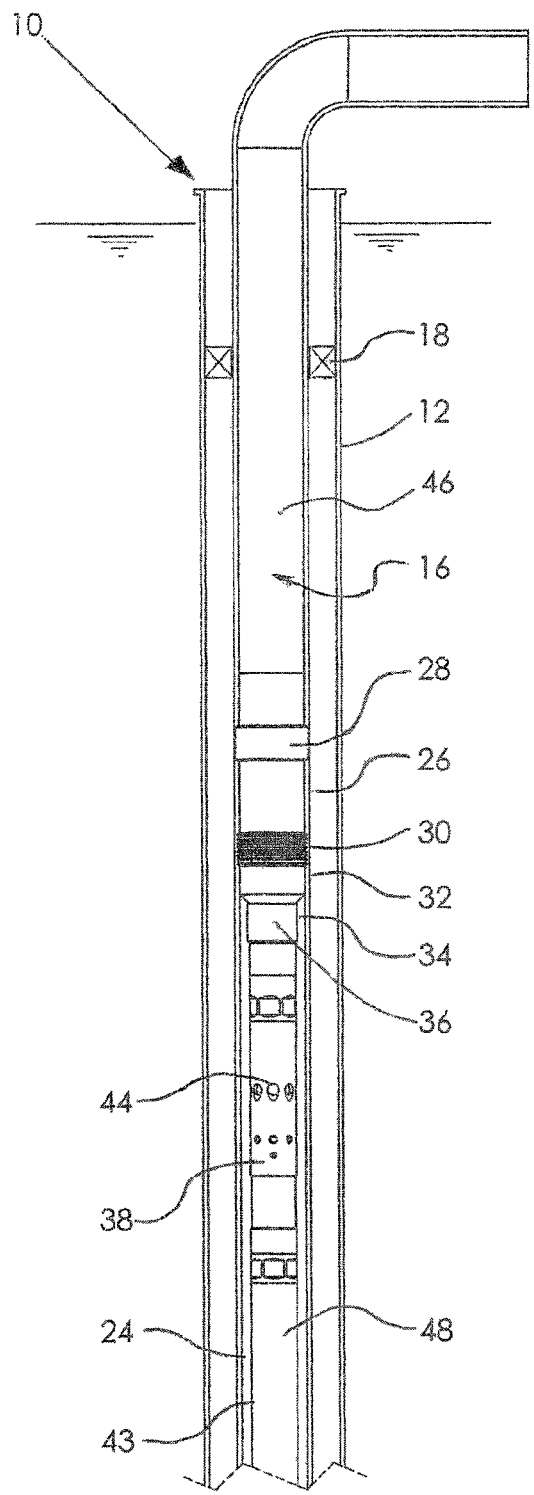
FIGS. 1A-1B comprise a schematic elevation sectioned view of a multi cycle shut-in tool in place in a production tubing string of a well.
Figure 1B:
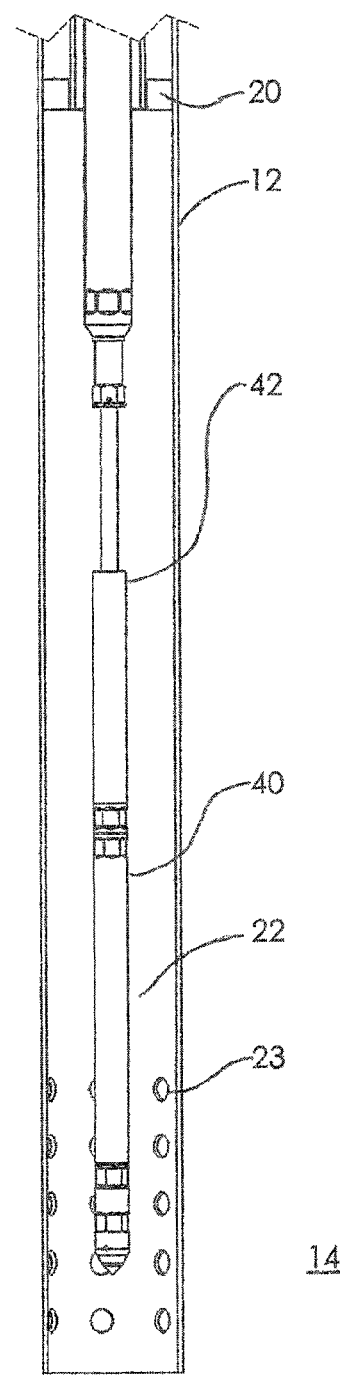

Referring now to the drawings, and particularly to FIGS. 1A-1B, an oil well is shown therein and generally designated by the numeral 10. The well 10 is defined by casing 12 disposed in a bore hole which intersects a subterranean hydrocarbon producing formation 14. A production tubing string 16 has an end thereof in place within the well casing 12 and is sealed against the casing 12 by upper and lower packers 18 and 20. A plurality of perforations 23 extend through the casing 12 to communicate the interior 22 of the casing 12 and the lower interior 24 of the production tubing string 16 within the subsurface formation 14, so that well fluids such as hydrocarbons may flow from the formation 14 through the perforations 22 and up through the production tubing string 16. Within this arrangement, well known to those of skill in the art, the production tubing acts as a fluid delivery conduit communicating the interior of the gas passageway formed by the wellbore with an exterior thereof at the surface, with the lower pressure in the production tubing acting to draw the higher pressure well fluid thereinto for delivery to the surface for production from the well.

A landing nipple 26 is made up in the production tubing string 16 before the production tubing string 16 is placed within the well 10. A landing locking tool 28, also referred to as a lock mandrel 28, is shown in place locked within the landing nipple 26. The landing locking tool 28 carries packing 30 which seals within a seal bore 32 of landing nipple 26.

A mechanical equalizing sub 34 is hung below the lock mandrel. This mechanical equalizing sub 34 is design to act as a secondary relief valve in the case that the shut-in tool fails to re-open. The mechanical equalizing sub 34 can be manually opened by breaking the plug 36 off. The plug 36 is often referred to as a kobe equalizing plug.

The shut-in valve apparatus 38 is connected to the mechanical equalizing sub 34 which is connected to the locking mandrel 28 and thereby supported by the landing nipple 26. A pressure recording apparatus 40 is connected to a shock absorber 42 hung below the lower end of the shut-in tool universal drive assembly 43.

The foregoing known arrangement of the landing nipple, lock mandrel equalizing sub and shut-in valve apparatus acts to sealingly support the shut-in valve apparatus within the production tubing, the packing of the lock mandrel sealingly closing off the annular space between the valve apparatus and the production tubing, so that any well fluid drawn into the production tubing from the formation can only pass this seal further toward the surface by passing through the valve apparatus disposed within the production tubing.

The shut-in valve apparatus has a plurality of flow ports 44 defined through the valve housing thereof as seen in FIG. 1A. When the shut in valve apparatus is in the open position, well fluids can flow from the formation 14 up through the interior 24 of the production tubing string 16 then up through the annular space defined between the production tubing string 16 and each of the shut-in valve apparatus 38 and the pressure recording device 40, then inward through the larger flow ports 44 and up into an upper interior portion 46 of the production tubing string 16 which carries the fluid to the surface. When the larger flow ports 44 of the shut-in valve apparatus 38 are closed, no such flow is provided and the fluids in sub-surface formation 14 are shut in so that the well fluids cannot flow up through the production tubing string past the landing nipple 26.

The landing nipple 26 and landing locking tool 28 are themselves a part of the prior art and may for example be and otis ® X® landing nipple and lock mandrel as is available from Otis Engineering Corp. of Dallas, Tex.

The landing locking tool 28, with mechanical equalizing sub 34, the attached shut-in valve apparatus 38, the shock absorber 42, and pressure recording apparatus 40 is lowered down into the production string 16 on a slickline (not shown) and locked in place in the landing nipple 26 when it is desired to run a drawdown/buildup test. After the test is complete, the slickline is again run into the well and reconnected to the landing locking tool 28 with the attached shut-in tool valve apparatus 38 and pressure recording device 40 for removal of these components from the wellbore.

Valve and Drive

Figure 2A:
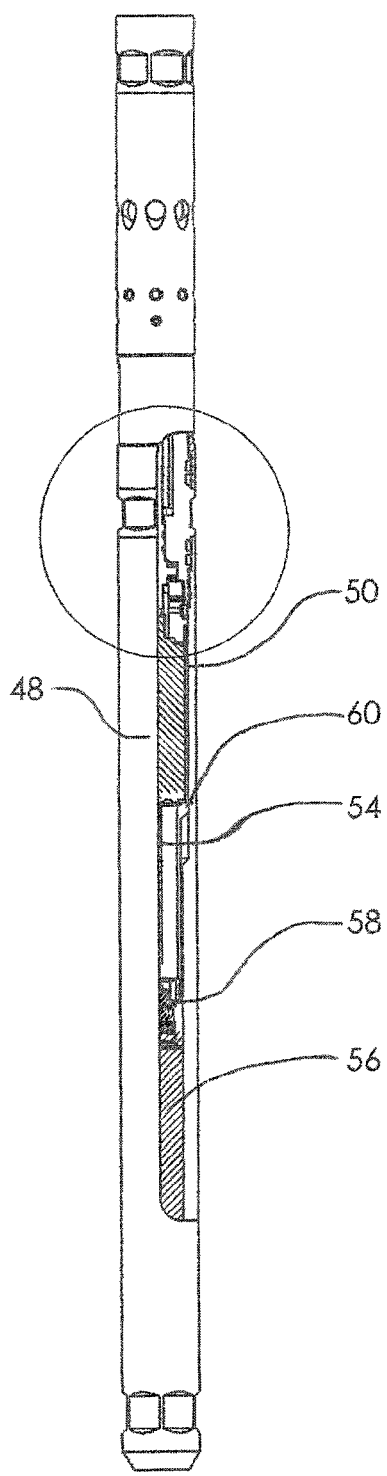
FIGS. 2A-2B comprise a partially section view of the multi cycle shut in tool generic valve and universal drive section.
Figure 2B:
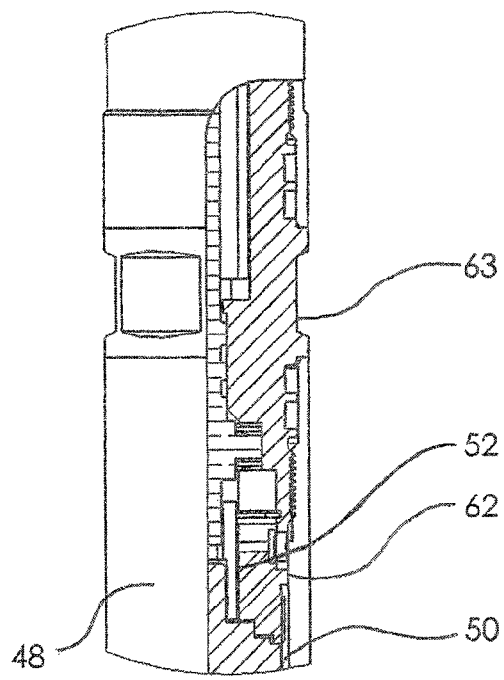

Now referring to FIGS. 2A-2B, the multi cycle shut-in tool apparatus is a mating of two assemblies: the valve section 38 and the drive section 43. The drive section includes an outer housing 48, a motor 50, a coupling 52, a circuit card assembly 54, a power supply or battery pack 56, an electrical connector 58, an electronics carrier 60, and a motor flange adapter 62. The motor 50 is a preferably an electric motor of small size to fit in the housing and travel down production tubing with appropriate gearing to provide adequate torque and speed characteristics to drive the valve assembly.

The universal drive assembly 43 can be removed from the valve assembly 38. The drive assembly is built to accompany a variety of sizes and types of valves.

The universal drive assembly 43 includes a tubular outer housing 48 which on the open upper end (toward the surface of the completion) contains a box threaded connection to connect to any of the valve assemblies. On the bottom end of the housing 48, a second threaded connection exists to connect a shock absorber 42 or directly to a recording device 40. This shock absorber is then connected to pressure or temperature recorders 40 for recording pressure and temperature conditions down hole. Other sensors as may be appropriate may be attached to the tool.

Within the drive housing 48 is a motor flange adapter 52 which connects the electrical motor 50 to the electronics carrier 60. The motor flange adapter 52 also connects to the mating drive connection sub 63 on the valve apparatus. The motor flange adapter acts to secure the motor 50 directly to the valve assembly 38, which prevents the drive connection sub 63 from spinning when the motor 50 is powered on.

Inside of the electronics carrier 60 is the circuit card assembly 54. The circuit card assembly 54 includes a microprocessor (not shown) and a method of keeping time (not shown). Before the multi cycle shut-in tool is lowered into the completion, the microprocessor is pre-programmed with a set of instructions. The operator inputs the times at which the motor 50 should be powered on in a direction to close or open the valve. There can be a number of close and open operations. The operator also inputs to the microcontroller the maximum current set-points for the current draw of the motor 50. These set-points will instruct the motor to stop when a maximum current has been detected.

A suitable connector 58 attaches to the end of the electronics carrier 60 and allows for the power supply or battery pack 56 to connect and power the universal drive assembly 43. The same connector 58 doubles as a communication port for up and down loading of data to and from the circuit card assembly 54.

Production Valve

Now referring to FIGS. 3, 4, 5, 6, 7, the production valve assembly, is shown in its open, stage 1 closing, stage 2 closing, closed, and stage 1 opening conditions respectively, as experienced in order during operation. In a production state, fluid is normally travelling from the reservoir formation 14 and up the production string 16 to the surface.

The production valve assembly includes a main ported housing 64, drive connection sub 63, sliding sleeve 70, front and middle and rear main gaskets 72, 74 and 76, shuttle piston 78, shuttle piston front and rear gaskets 80 and 82, and translation shaft 84.

The valve's main ported housing 64 has two sets of a plurality of holes or ports 44 and 88 at spaced positions along the housing, the ports of each set circumferentially spaced about the housing to define ports extending transversely through the housing wall to communicate the interior of the tubular cylindrical housing with the exterior thereof. The larger ports, 44, are used to pass production fluid from the outside of the main ported housing 64 into the front space 90 of the valve, positioned above the larger ports 44 proximate the top end of the housing, towards the top of the well completion 46. Naturally, the number of larger ports 44 may be altered, for example decreased to as little as a single hole or increased from the number of holes shown in the figures. The smaller holes 88 are used to create a pressure differential across the sliding sleeve 70 of the production valve assembly 44, as described herein below, and similarly may be changed in number.

An inner surface of the housing's peripheral wall has a step 64a defined at a point therealong on a side of the smaller ports 88 opposite the larger flow ports 44 to increase in diameter across the step 64a toward the larger flow ports 44. The sliding sleeve disposed about the shuttle piston 78 between the shuttle piston and the inner surface of the housing's peripheral wall is has its outer surface correspondingly stepped immediately above a relief port 94 extending through its peripheral wall to increase the outer diameter of the sliding sleeve 70 across the relief port toward the housing's main flow ports 44. Movement of the sliding piston along the housing opens and closes an annular space 96 between the sliding sleeve 70 and the surrounding housing 64 at the smaller housing ports 88 depending on whether the larger or small diameter portion of the sliding sleeve 70 is situated at the smaller ports 88.

The sliding sleeve 70 has a peripheral wall supporting the front, middle and rear outside sealing gaskets 72, 74, and 76 that are proof against the production fluid, spaced apart longitudinally from front to back and annularly disposed about the sliding sleeve to seal against the surrounding inner surface of the housing 64. The front and middle gaskets 72, 74 are disposed about the upper larger diameter portion of the sliding sleeve with the rear gasket 76 disposed about the smaller diameter lower portion of the sliding sleeve at a distance below the relief port 94 therein. The words front and back are used to distinguish between opposite ends of the housing, with the front end and forward direction being associated with the top end and upward direction in the illustrated embodiments shown in an in-use position for a vertical wellbore, forward thus referring to motion toward the surface at the top end of the wellbore. For best dynamic behaviour, the valve and the tool of which it forms a part should be placed immediately above the production formation 14.

Figure 3:
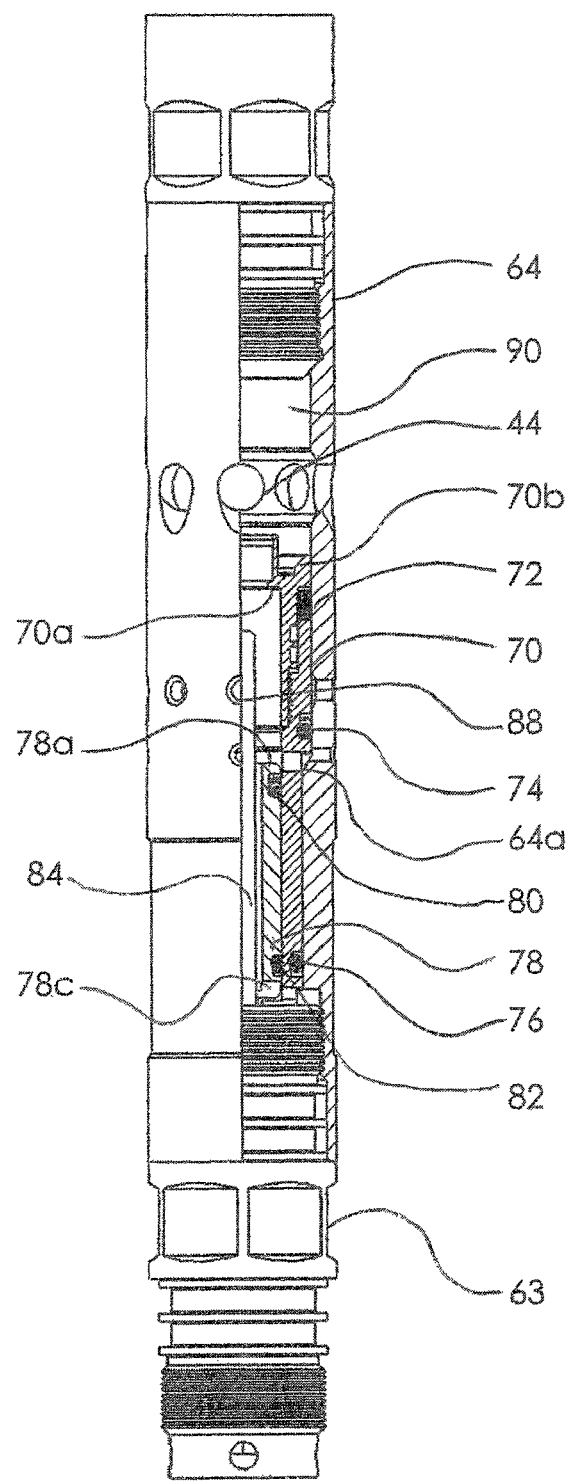
FIG. 3 comprises a partially sectioned view of the production valve in its open condition.

When, as shown in FIG. 3, the front gasket 72 lies behind the larger ports 44, the flow of production fluid passes from the outside of the main ported housing 64 through the larger ports 44 and into the front space 90 in order to rise towards the surface, the valve being in its open condition.

The translation shaft 84, is coupled to the motor in the drive section as seen in FIG. 2B. The coupler 52 can then be inserted into the male shaft of the motor 50 on the universal drive section 43. The translation shaft is allowed to rotate; threads on the upper end of the shaft are inserted into the bottom of the shuttle piston 78 of the production valve assembly, which is correspondingly internally threaded to effect linear movement thereof in response to rotation of the externally threaded translation shaft to which it is engaged.

The bottom end of the shuttle piston 78 is keyed and rests in a mating keyed portion of the sliding sleeve 70. The bottom of the sliding sleeve 70 is also keyed and rests in the upper portion of the drive connection sub 63. This series of keys prevents the shuttle piston 78 and sliding sleeve 70 from rotating with respect to the main ported housing 64 and the drive connection sub 63. When the motor 50 from the universal drive section 43 is instructed to rotate, the translation shaft 84 begins to rotate and the threads on the translation shaft 84 are spun inside of the mating threads on the shuttle piston 78 which cause the shuttle piton to move in an axial direction. Depending on the direction of the rotation of the motor 50 in the drive section 43 and thus the direction of the rotation of the coupling 52 and the translation shaft 84 in the production valve assembly 38, the shuttle piston 78 is forced to move in an axial direction either forward towards the surface, to effect closing of the valve, or backwards towards the drive section 43, to effect opening of the valve. The shuttle piston thus acts as a driven member operatively coupled to the motor by the translation shaft to effect linear displacement of the shuttle piston along the housing between a fully retracted position furthest from the flow ports 44 on a side thereof opposite the top end of the housing and a fully extended position proximate the main flow ports 44.

From the open condition shown in FIG. 3 with the shuttle piston in the fully retracted position, the motor 50 is instructed to turn in a direction causing the shuttle piston 78 to move in an upward direction toward the main flow ports 44 and the fully extended position.

Figure 4:
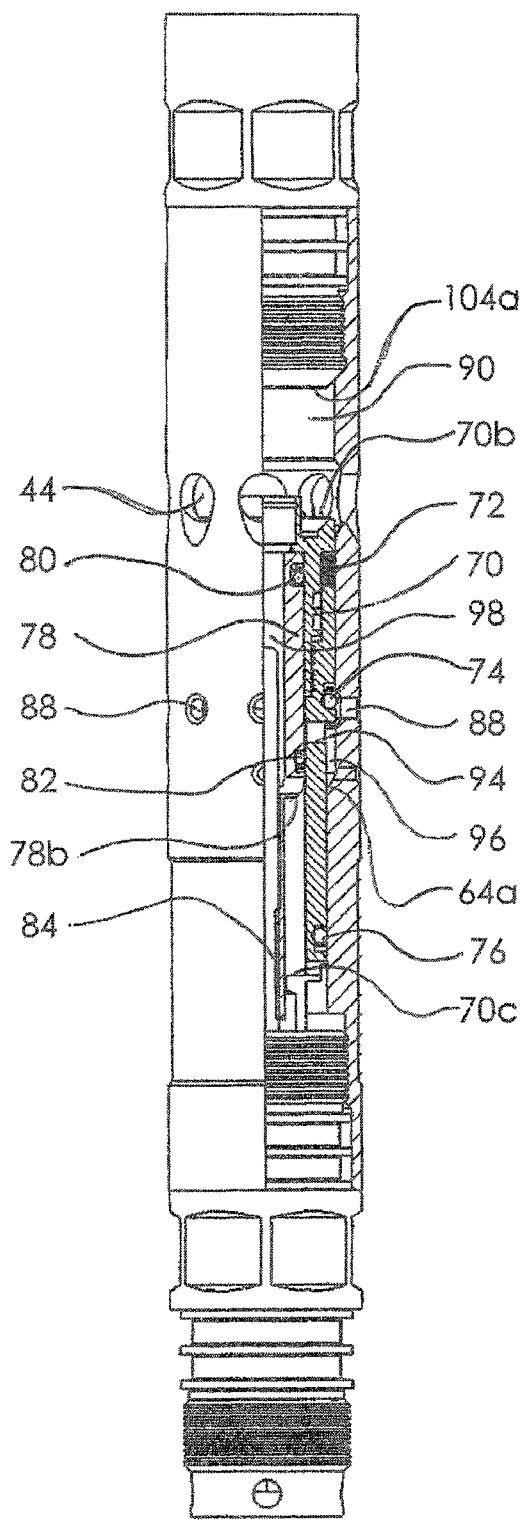
FIG. 4 comprises a partially sectioned view of the production valve in its stage 1 closing condition transitioning toward its closed condition.

Now referring to FIG. 4, the shuttle piston 78 will first move upward relative to the housing and the sliding sleeve 70 disposed between the shuttle piston and the housing and close the relief port 94 located on the sliding sleeve 70. When the shuttle piston front and rear gaskets 80 and 82 annularly disposed about the shuttle piston at spaced points therealong to seal against the surrounding sliding sleeve are straddling the relief port 94 on the sliding sleeve after this initial upward movement of the shuttle piston, the relief port now disposed between these gaskets is said to be closed and fluid can no longer travel from the space outside of the sliding sleeve 70 to the space inside the hollow sliding sleeve or inside the hollow the shuttle piston 78 disposed therewithin.

After continued upward motion relative to the sliding sleeve 70 surrounding it, a front end 78a of the shuttle piston 78 now contacts an inwardly projecting edge or flange 70a defining a stop near the front of the sliding sleeve 70. When the shuttle piston 84 continues to move forward from this point, the sliding sleeve 70 must also move forward, as it is carried by the shuttle piston during further motion thereof toward the flow ports 44 due to engagement of the stop defined between the piston and sleeve by the sleeve's flange 70a and the piston's top end 78a. The movement of the sliding sleeve forward forces the middle main gasket 74 to move past the smaller ports 88 in the main ported sleeve 64 that were previously closed off by the first and second main gaskets 72, 74, between which the smaller ports 88 were disposed prior to upward movement of the sliding sleeve, and opens the annular space 96 between the sliding sleeve 70 and the housing 64 at the smaller ports 88 by moving the smaller diameter lower portion of the sliding sleeve 70 upward to the larger diameter portion of the housing's interior at which the small holes are located. Production fluid from outside the main ported housing 64 is allowed to enter and pressurize the space 96 located within the housing but outside of the sliding sleeve between the middle main gasket 74, still sealed between the larger diameter portions of the sleeve and housing but now above the small ports 88, and the rear main gasket 76 still sealed with the smaller diameter portion of the housing below the smaller ports 88 and the annular space 96.

Referring to FIG. 4, with the increase the hollow cylindrical sleeve's outer diameter from the small diameter sleeve portion to the large diameter sleeve portion between the middle and rear main gaskets 74, 76 and the corresponding greater diameter of the middle gasket 74 relative to the rear gasket 76, the pressure of the production fluid entering the annular spacing 96 between the housing 64 and the sleeve 70 and the housing 64 exerts a net upward force on the sleeve and gasket assembly, acting toward the larger ports 44. Expecting that the pressure of the production fluid entering the main ported housing 64 through the smaller ports 88 is greater than the pressure entering the main ported housing 64 through the larger ports 44 further up the production tubing 16, the opening of the smaller ports 88 by the movement of the middle seal 74 therepast under upward carrying of the sleeve 70 by the shuttle piston 78 and the resulting filling of the annular space 96 with the higher pressure production fluid may be sufficient to immediately produce such an upward force on the sleeve 70 at the middle seal 74 and the step or shoulder between the small and large diameter portions of the sleeve that is sufficient to overcome any downward force exerted on the sleeve at the top end thereof by the lower pressure production fluid entering the housing 64 over the sleeve 70 at the larger ports 88 and slide the sleeve 70 upward along the main ported housing 64 relative to the still moving shuttle piston 78 toward the larger ports 44, lifting the sleeve's upper flange 70a from atop the shuttle piston 78. This force causes the sliding sleeve to immediately travel upwards and into the stage 2 closing position shown in FIG. 5.

Figure 5:
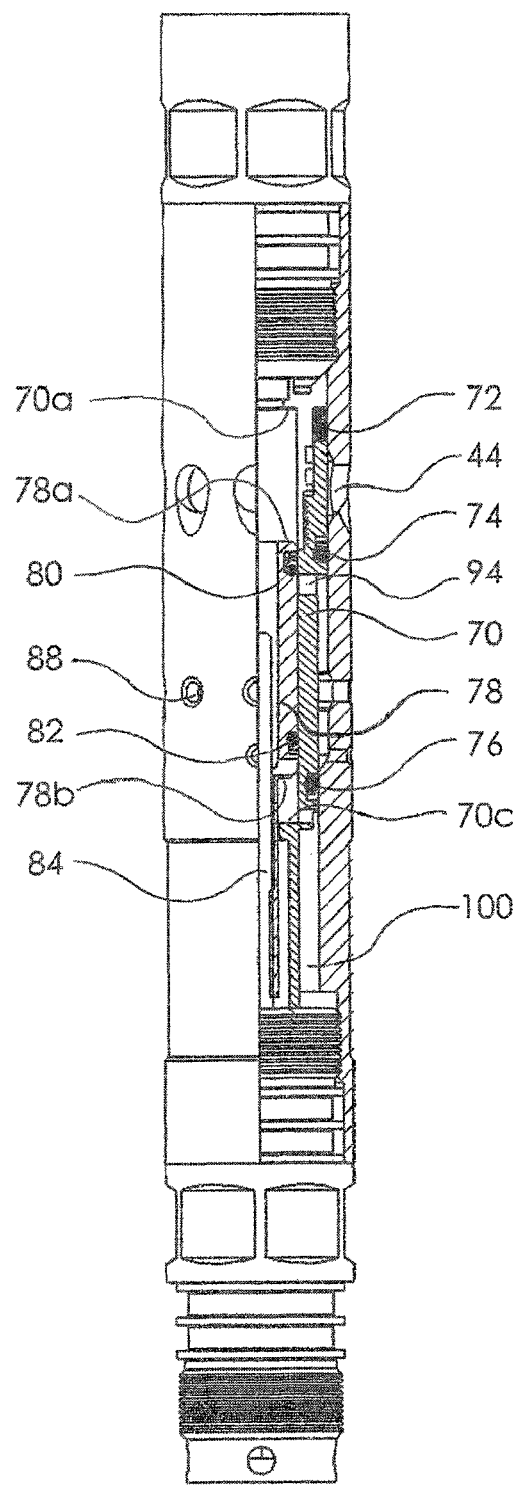
FIG. 5 comprises a partially sectioned view of the production valve in its stage 2 closing condition further transitioning toward its closed condition from the stage 1 closing condition.
Figure 6:
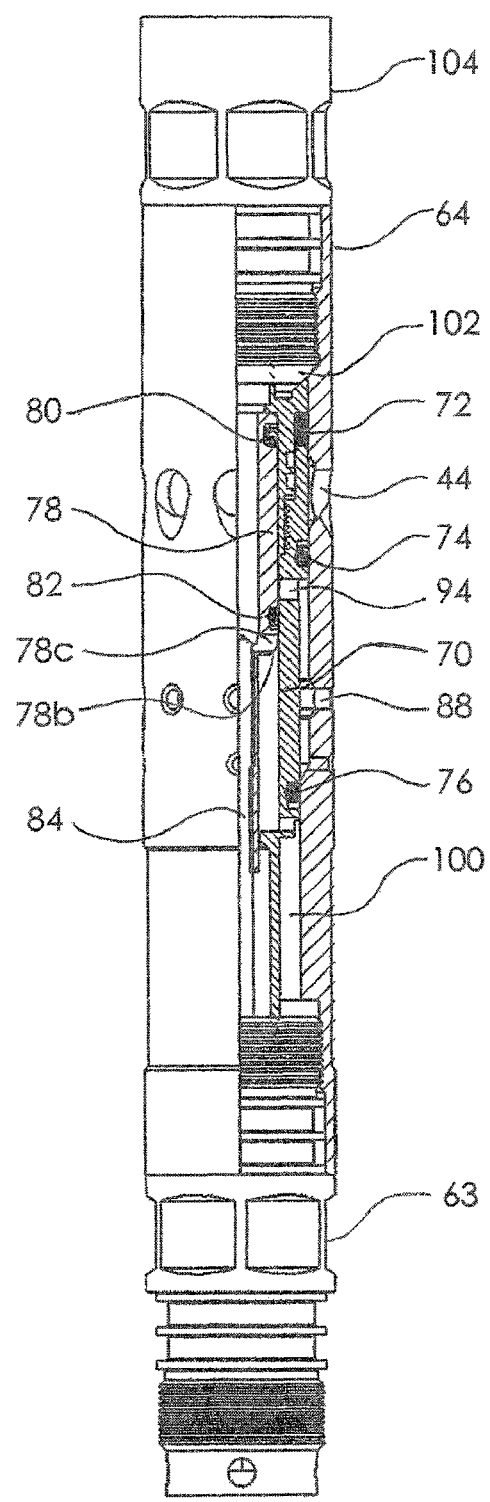
FIG. 6 comprises a partially sectioned view of the production valve in its closed condition.

When, as shown in FIG. 5, the sliding sleeve is advanced into the front space 90 so that the rear gasket 76 lies behind the smaller ports 88 still sealed with the smaller diameter portion of the housing, the middle gasket 74 lies behind the larger ports 44 and in front of the smaller ports 88 sealed with the larger diameter portion of the housing, and the front gasket 72 lies in front of the larger ports 44 also sealed with the larger diameter portion of the housing, the production fluid from outside the housing 64 is prevented from passing into the front space 90 or from passing into rear space 100, found rearward of the sealing between the sliding sleeve and housing, by the gaskets 72, 74, 76, 80 and 82. The sliding sleeve thus acts as a closure member slidable along the housing into a closed position closing off the housing ports 44. Further, the sliding sleeve is continued to be forced in the upward direction by the differential pressure acting on the surface of the middle main gasket 74 and the shoulder of the sleeve formed by the step in the sleeve's outer diameter. Further, the shuttle piston gaskets 80 and 82 continue to straddle the relief port 94 preventing the flow of fluid from the annular space 96 outside the sliding sleeve to the space 98 thereinside. In this state, the sliding sleeve is in a closed position closing off access to the housing interior through the main flow ports 44. The production fluid is thus prevented from going to the surface, so long as sealing means are provided between the main ported housing 64 and the wall of the production tubing 16.

The shuttle piston 78 continues to move in the forward direction towards the surface. The shuttle piston 78 moves forward until it rests in its fully extended position shown in FIG. 6, corresponding to the closed condition of the valve apparatus. The shuttle piston 78 is no longer permitted to travel forward towards the surface due to contact with the flange 70a of the sleeve preventing further relative motion of the shuttle piston along the sliding sleeve toward the surface and contact of an upper end 70b of the sleeve with a bottom end 104a of the equalizing sub crossover 104 preventing motion of the sliding sleeve past its position closing of the larger flow ports 44. The equalizing sub crossover 104 connecting the housing 63 and the equalizing sub 34 thus defines a stop between the housing and the sliding sleeve to limit motion of the sliding sleeve past its closed position, sealing off the larger flow ports 44, further toward the surface. The load on the motor 50 in the universal drive assembly 43 reaches a preset limit and the motor 50 is instructed by the circuit card assembly 54 to stop operating. The sliding sleeve and the shuttle piston rest in positions that continue to block the flow of fluid through the relief port 94 and further through the larger ports 44 and thereby the valve remains in its close condition. The differential pressure continues to force the sliding sleeve 74 in a forward direction, the engagement of the sliding sleeve and equalizing sub crossover acting to prevent fluid from passing through the space 102 located between the top of the sliding sleeve 70 and the equalizing sub crossover 104. This metal to metal seal of the top end 70b of the sliding sleeve and the bottom end 104a of the equalizing sub crossover 104 acts as insurance to the potential failure of the front main gasket 72.

Referring back to FIG. 4, should the filling of the annular space 96 with production fluid during opening of the smaller ports 88 not be sufficient to immediately effect sliding of the sleeve 70 relative to the shuttle piston 78 toward the larger ports 44 for closing thereof, the downward force exerted on the sleeve and gasket assembly by the production fluid entering the main ported housing 64 through the larger ports 44 will decrease as this flow through the larger ports 44 is choked off and accordingly reduced in pressure as the top end of the sleeve 70 reaches and begins crossing these ports during upward carrying of the sleeve on the upward moving shuttle piston. Under this reduction of downward force on the sleeve, an imbalance between the fluid pressure forces on the sleeve and gasket assembly is generated to reach a point where the upward force is sufficient to quickly slide the sleeve upward relative to the upward moving shuttle piston 78 to more quickly complete the closing of the larger ports 44 than would occur by upward carrying of the sleeve by the driven motion of the shuttle piston alone. As shown in FIG. 4, the sleeve 70 of the valve of FIGS. 2 to 7 is dimensioned to have a length that has the top end of the sleeve reaching the larger ports 44 as the middle seal 74 completes its movement across the smaller ports 88 so that the closing off the larger ports 44 begins during or promptly after the opening of the smaller ports 88

Figure 7:
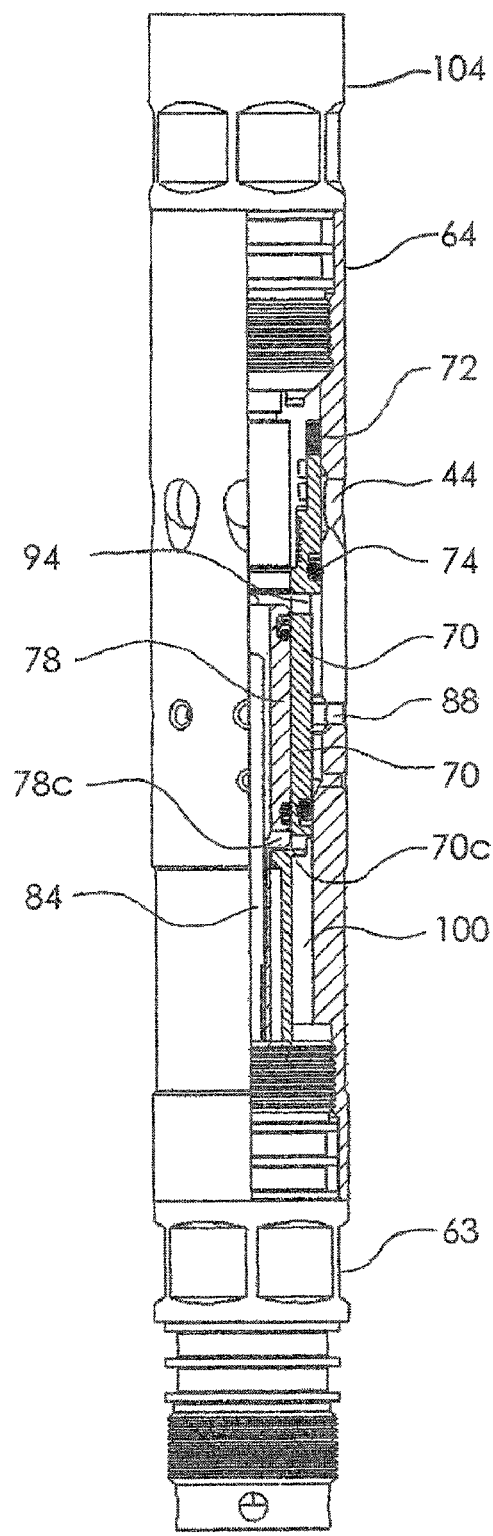
FIG. 7 comprises a partially sectioned view of the production valve in its stage 1 opening conditioning transitioning toward its open condition from the closed condition.

Once the valve has been completely closed to seal off the larger ports 44 and has remained closed for a desirable period of time, an opening command of the circuit card assembly is given, upon which the motor 50 is turned in the opposite direction, which causes the shuttle piston 78 to retract towards the drive assembly 43. The shuttle piston 78 is pulled back, opening the relief ports 94 in the sliding sleeve 78 which releases the differential pressure acting to force the sliding sleeve 70 toward the closed position. Production fluid can now travel from the annular space 96 between the sleeve and the housing into the space 98 inside the sleeve and piston. The shuttle piston gaskets 80 and 82 are now located behind the relief port 94. The pressure differential and therefore the upward force acting on the sliding sleeve 70 no longer exists. The valve is said to be in its pressure relief state as seen in FIG. 7.

The bottom end 78b of the shuttle piston 78 is now contacting the bottom end 70c of the sliding sleeve 70, which projects inward past the outer periphery of the shuttle piston 78 below the bottom end 78b thereof, defining an additional stop between the sliding sleeve and the shuttle piston to limit sliding therebetween in a direction opposite the other stop defined by the top end 78a of the shuttle piston and the inwardly extending flange 70a of the sliding sleeve. Movement of the motor in the direction which causes the shuttle piston 78 to move in the backwards direction towards the drive section 43 will now thus also result in the movement of the sliding sleeve 70 in the same direction towards the drive section 43, due to pulling of the sliding sleeve 70 with the shuttle piston 78 with this stop engaged. The front main gasket 72 passes over the large holes 44 and the middle main gasket 74 passes over the small holes 88, opening up the main flow ports 44 and closing off the smaller ports 88. The sliding sleeve 70 contacts the drive connection sub 63 and the current draw to the motor exceeds the pre-programmed value instructing the circuit card assembly 54 to stop the motor 50. The valve is again in its open condition seen in FIG. 3 with the bottom end 78b of the shuttle piston sitting atop the bottom 70c of the sliding sleeve in its fully retracted position at the drive connection sub 63, the shuttle piston having pulled the sliding sleeve to a position thereof furthest from the main flow ports 44.

The embodiment outlined above provides numerous substantial improvements in down hole shut in tools.

The shut-in valve for production reservoir monitoring has a shuttle piston which acts to open or close a relief port in the valve's sliding sleeve. With the relief port closed, driving of the shuttle piston moves the sleeve toward the larger flow ports 44 in the housing wall to open the smaller control ports 88 in the housing wall and move toward closing of the larger flow ports. During this motion of the sleeve with the shuttle piston, production fluid is used to exert a pressure differential that acts on the sliding sleeve to force the sliding sleeve in a direction which closes the valve.

The shuttle piston can move within the sliding sleeve and can also move the sliding sleeve in either of two axial directions. This range of motion creates a valve which will close quickly when a differential pressure exists, but will continue to close without a differential pressure present.

Once the valve is closed, the shuttle piston can be retracted, thereby opening the relief port in the sliding sleeve, which removes or reduces the differential pressure and allows the shuttle piston to move the sliding sleeve back to its starting open position.

The shut-in valve is provided with an electric timer and control and measurement system which operates the electrical motor thereby controlling the position and motion of the shuttle piston. The electric timer is used to open and close the valve at predetermined and pre-programmed segments. The control system controls the movement of the electric motor which in turn moves the shuttle piston. The measurement system records data to feedback to the control circuit, this data is also helpful for troubleshooting purposes.

Injection Valve

The injection valve described herein below is similar to the production valve, however, the location of the relief port and the direction of the fluid flow (differential pressure) has changed. In the case of an injection well, the higher fluid pressure exists in the tubing, and the lower fluid pressure exists in the formation.

The injection valve shown in FIGS. 8 to 12 is similar in structure and operation to the shut-in valve described herein above, but differs somewhat due to the reverse direction flow resulting from the difference in the relative locations of the high and low pressure fluids in the two applications. In production, the pressure of the fluids in the wellbore from the fracture exceeds pressure within the production tubing and valve housing, so well fluids flow into the valve housing and up the production tubing. Injection applications involve providing a higher pressure fluid into the tubing and through the valve so that it will flow into the lower pressure of the wellbore and fracture. The injection valve uses the same drive assembly as the production valve and similarly uses differential pressure to effect quick closing of the sliding sleeve, but requires somewhat different structure to perform this function due to the reversal of high and low pressure regions inside and outside the valve housing.

Figure 8:
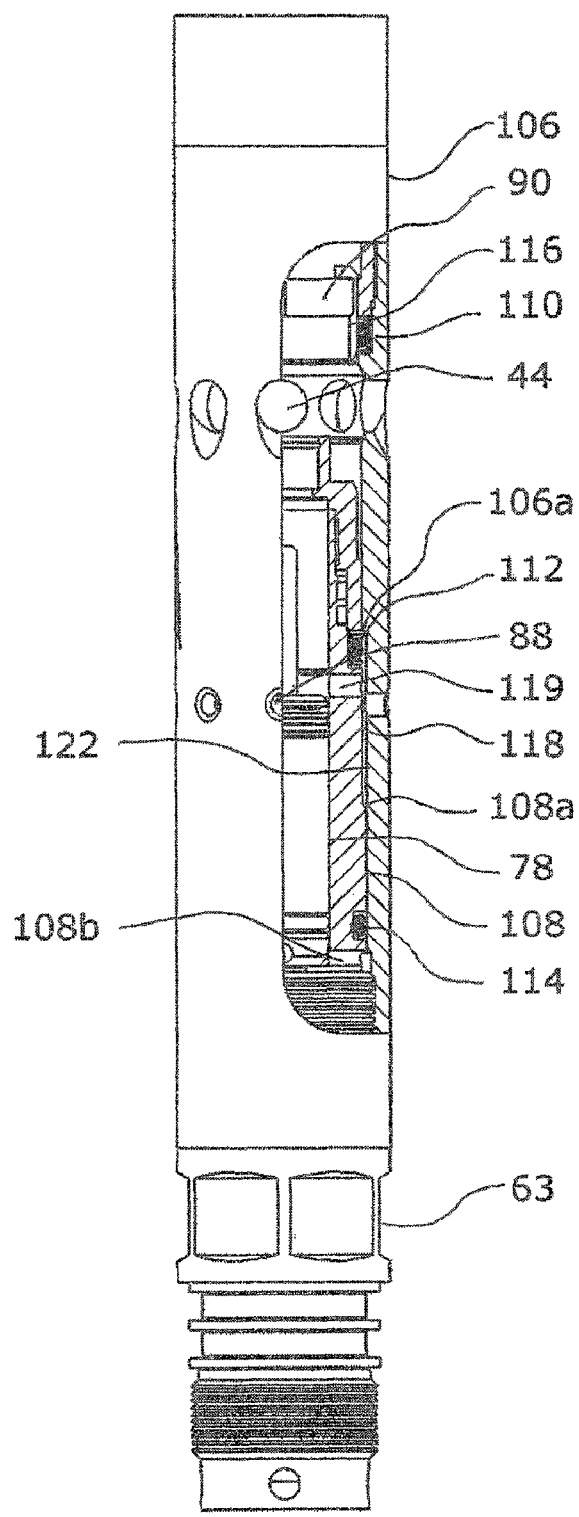
FIG. 8 comprises a partially sectioned view of an injection valve in its open condition.

Now referring to FIG. 8, the injection valve assembly is shown in its open condition. In an injection state, fluid is normally injected into the production formation, therefore travelling from the surface down the production string 16 and into the reservoir formation 14.

The injection valve assembly includes a main ported housing 106, drive connection sub 52, sliding sleeve 108, upper main gasket 110, middle main gasket 112, rear main gasket 114, shuttle piston 78, front and rear shuttle piston gaskets 80 and 82, and upper main gasket protection sleeve 116.

An inner surface of the housing's peripheral wall has a step 106a defined at a point therealong between the smaller ports 88 and the larger flow ports 44 to increase in diameter across the step 106a away from the larger flow ports 44. The sliding sleeve 108 disposed about the shuttle piston 78 between the shuttle piston and the inner surface of the housing's peripheral wall is has a corresponding step 108a in its outer surface at a distance below the relief port 119 extending through its peripheral wall to increase the outer diameter of the sliding sleeve 108 across the step 108a in the rearward direction away from the surface of the well and the larger flow ports 44. Movement of the sliding piston along the housing opens and closes an annular space 118 between the sliding sleeve 108 and the surrounding housing 106 at the smaller housing ports 88 depending on whether the larger or small diameter portion of the sliding sleeve 108 is situated at the smaller ports 88.

The front main gasket 110 is supported on the inner surface of the peripheral wall of the housing 106 above the larger flow ports 44 on the smaller diameter portion of the housing to seal against the corresponding smaller diameter upper portion of the sliding sleeve 108 when in the closed position. The middle main gasket is disposed about the smaller diameter upper portion of the sliding sleeve just above the relief port 119 to seal against the smaller diameter upper portion of the housing 106 when slid upward thereto during motion the sliding sleeve 108 toward the larger flow ports 44 from its position furthest therefrom against the drive connection sub 63 with the valve in the open condition of FIG. 8. The rear main gasket 76 is disposed about the larger diameter lower portion of the sliding sleeve 108 at a distance below the step 108a thereof. Unlike the shut-in valve, where the steps are engaged in contact with another to substantially close the annular space between the sleeve and the housing with the shuttle piston and sleeve fully retracted against the drive connection sub, here the annular space 118 between the sleeve and the housing 106 is fully open with the shuttle piston in its fully retracted position and the sliding sleeve correspondingly disposed in its furthest position from the main flow ports 44. In this condition, as shown in FIG. 8, the smaller ports 88 are not sealed off as they are in the shut-in valve of FIGS. 3 to 7. The smaller ports 88 communicate with the annular space 118 and relief valve 119 with the shuttle piston and sliding sleeve fully retracted.

In the open condition, as shown in FIG. 8, the injection fluid is allowed to travel from the surface down the production tubing string 16 into the front space 90 above the valve, out through the larger ports 44 in the main ported housing 106, down past the space between the drive assembly 43 and the production string 16, into the open space 22, and into the production formation 14.

Figure 9:
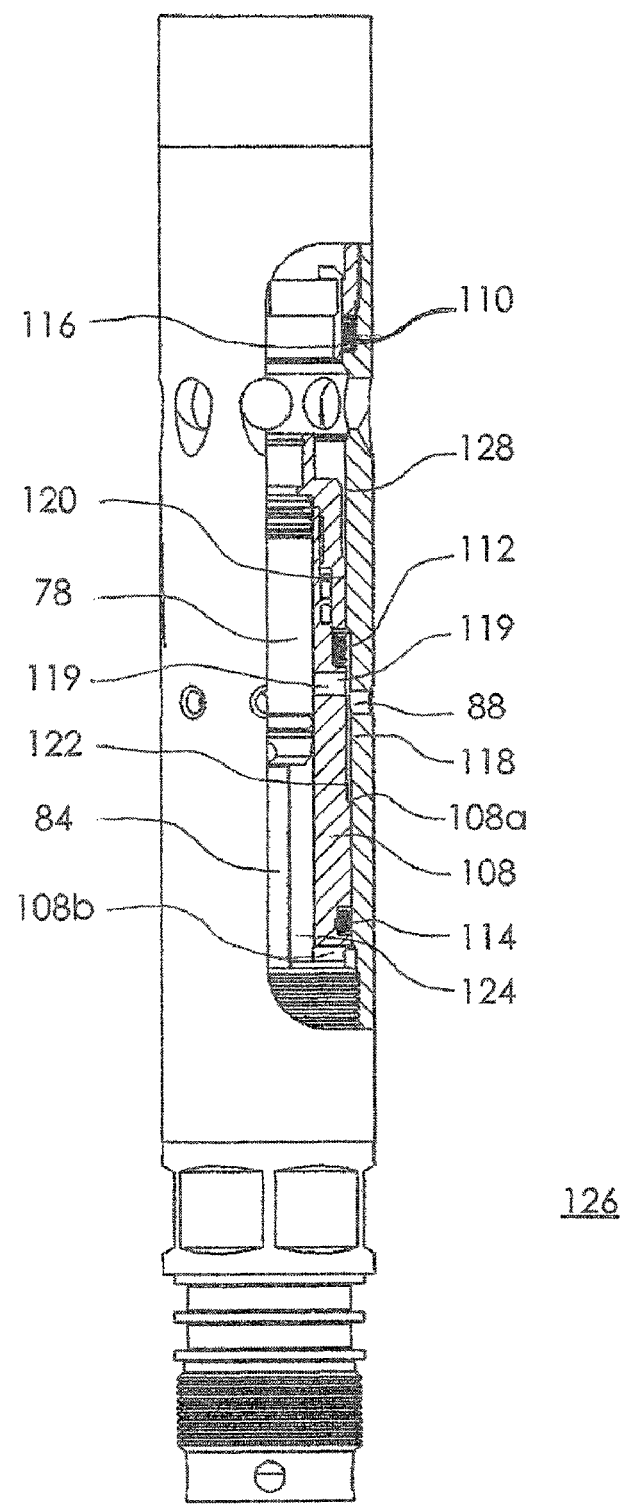
FIG. 9 comprises a partially sectioned view of the injection valve in its stage 1 closing condition transitioning toward its closed condition.

Upon a closing command from the circuit card assembly 54 in the drive assembly 43, the motor 50 begins to turn in a direction that moves the shuttle piston 78 forward toward the surface. The shuttle piston 78 moves toward the end of the sliding sleeve 108 as seen in FIG. 9. The front and rear shuttle piston gaskets 80 and 82 now block the flow of fluid from the space 90 above the valve to the annular space 118 through the relief port 119 in the sliding sleeve 108.

Under further motion toward the main flow ports 44, the shuttle piston 78 now contacts the sliding sleeve end and the movement of the motor 50 continues to push the shuttle piston 78 forward toward the surface and now, due to this contact, the sliding sleeve 108 is also moved in a forward direction toward the surface.

The main middle gasket 112 seals against the seal bore 120 of the main ported housing 106 at the smaller diameter upper portion thereof and the rear gasket 114 continues to seal against the seal bore 122 of the main ported housing at the larger diameter lower portion thereof. The shuttle piston is hollow and has a passage 78c defined transversely through its periphery wall adjacent its bottom end 78b, as shown for the production shut-in valve of FIGS. 3 to 7, and the sliding sleeve 108 has a corresponding passage 108b defined transversely through its periphery wall adjacent its bottom end 108c. With the rear main gasket 114 and corresponding seal bore 122 being of larger size than that of the middle main gasket 112 and corresponding seal bore 120 due to the stepped outer and inner dimensions of the sliding sleeve and housing respectively and with the fluid pressure in the space 124 below the sliding sleeve 78 being of higher pressure than that of the fluid pressure in the space 126 outside of the main ported housing 106, a differential pressure exists and a force is placed on the sliding sleeve 108 from below in the forward direction towards the surface. This force causes the sliding sleeve to instantly slide forward toward the surface.

Figure 10:
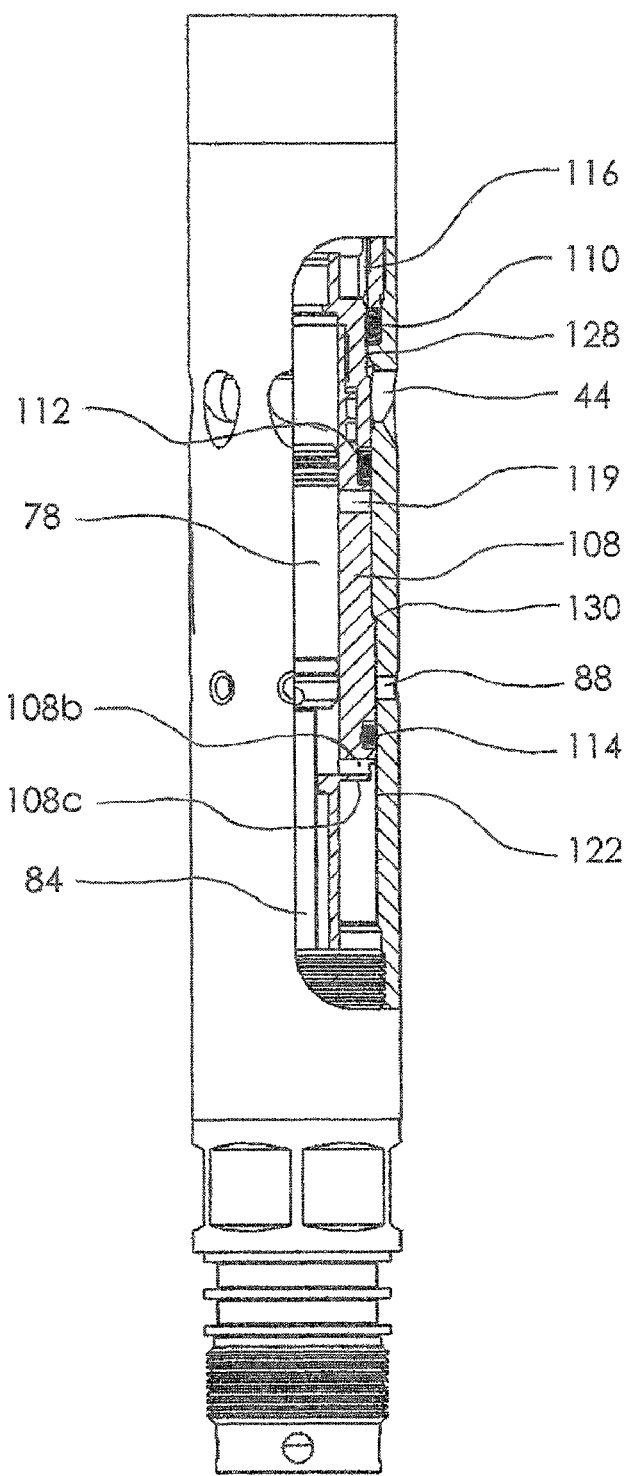
FIG. 10 comprises a partially sectioned view of the injection valve in its stage 2 closing condition further transitioning toward its closed condition from the stage 1 closing condition.

Now referring to FIG. 10, the moving sliding sleeve will first contact an upper main gasket protection sleeve 116 slidably disposed over the front main gasket 110 at the inner periphery of the small diameter upper portion of the housing 106 and force it in a direction forward to expose the front main gasket 110. The upper main gasket seal bore 128 defined by the small diameter upper portion of the sliding sleeve will seal against the upper main gasket 110. The sliding sleeve 108 will stop moving when the two steps defined on the inner periphery of the housing and the outer periphery of the sliding sleeve contact one another, as shown at 130 in FIG. 10.

The shuttle piston gaskets 80 and 82 continue to straddle the relief ports 119 and prevent fluid from passing therethrough from the space 124 below the shuttle piston 78 to the annular space 118 between the sliding sleeve 108 and the housing 106. The upper main gasket 110 and the middle main gasket are sealed between the sliding sleeve and the housing on opposite sides of the main flow ports 44, preventing fluid from passing through the large holes 44 in the main ported housing 106. The middle main gasket and the rear main gasket on the sliding sleeve are sealed to the smaller diameter upper portion and larger diameter lower portion of the housing respectively on opposite sides of the small holes 88 in the main ported housing 106 to prevent fluid from passing therethrough. The injection fluid is now prevented from travelling from the surface down the production tubing string 16 into the formation 14. The sliding sleeve is now in its closed position sealing off the main flow ports 44.

Figure 11:
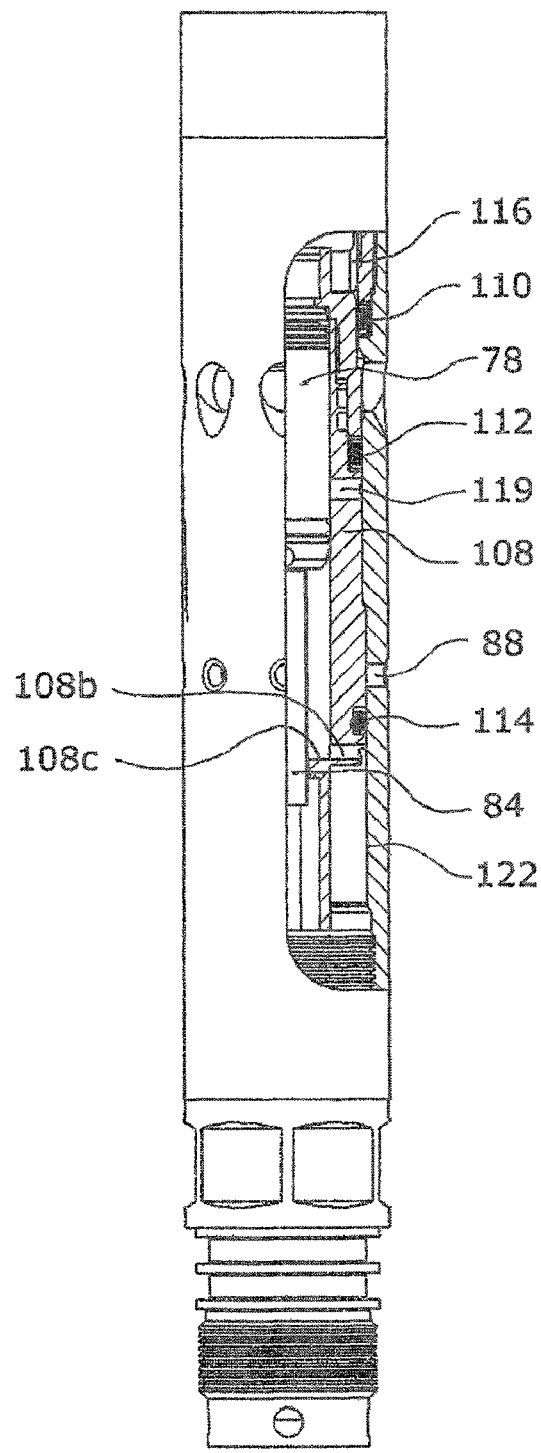
FIG. 11 comprises a partially sectioned view of the injection valve in its closed condition.

Now referring to FIG. 11, the shuttle piston 78 has reached the fully extended position at the end of its forward travel and has contacted the stop defined on sliding sleeve 108 near the upper end thereof, like that described herein above for the production shut-in valve. The contact has increased the torque on the motor 50 which is measured by the increase in current. The pre-programmed current set point has been reached and the motor is instructed to turn off.

Figure 12:
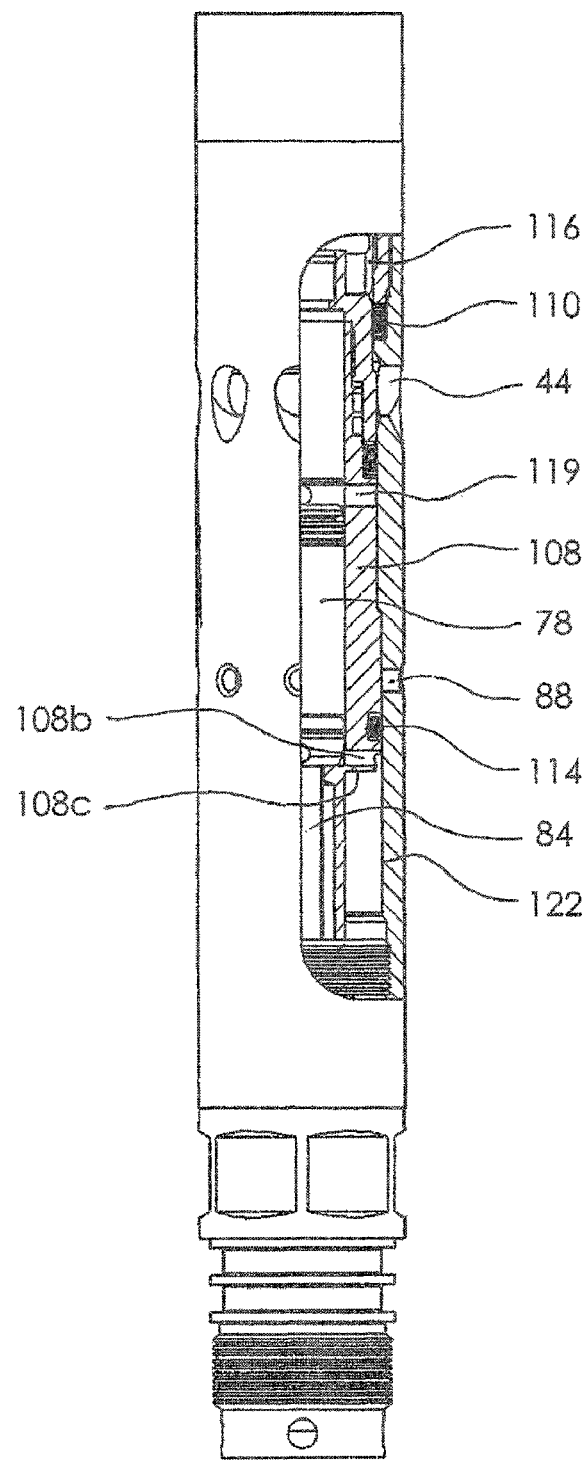
FIG. 12 comprises a partially sectioned view of the injection valve in its stage 1 opening conditioning transitioning toward its open condition from the closed condition.

Now referring to FIG. 12, when the valve is to be opened, the pre-programmed circuit card assembly 54 instructs the motor 50 to rotate in the direction required to move the shuttle piston 78 in the backward direction toward the drive section 43. The shuttle piston 78 moves backward toward the retracted position, the front shuttle piston gasket 80 passing under the relief port 119 of the sliding sleeve 108 to effect re-opening thereof. Fluid is now allowed to travel from the space 124 below the sliding sleeve to the annular space 118 between the sliding sleeve and the housing, eliminating or reducing the pressure differential across the sliding sleeve 108 which forces it in a direction towards the surface. The valve is now said to be in a pressure relief state.

The shuttle piston 78 continues to move backward in a direction towards the drive section 43 and contacts the bottom end 108c of the sliding sleeve 108. Through this contact, the shuttle piston 78 and sliding sleeve 108 now both move in a direction towards the drive section 43. The upper main gasket 110 and corresponding upper main seal bore 128 separate, allowing injection fluid to pass through the large holes 44 in the main ported housing 106. The shuttle piston 78 and the sliding sleeve 108 stop moving once the sliding sleeve 108 contacts the drive connection sub 63 as shown in FIG. 8. The valve is now said to be back in the open position.

Inductive Coupler Communication Device

In some embodiments, the shut in tool may include an inductive coupler section located in the equalizing sub crossover 104 at the open upper end of the valve housing, designed to communicate reservoir measurement data to the surface of the completion.

Figure 13:
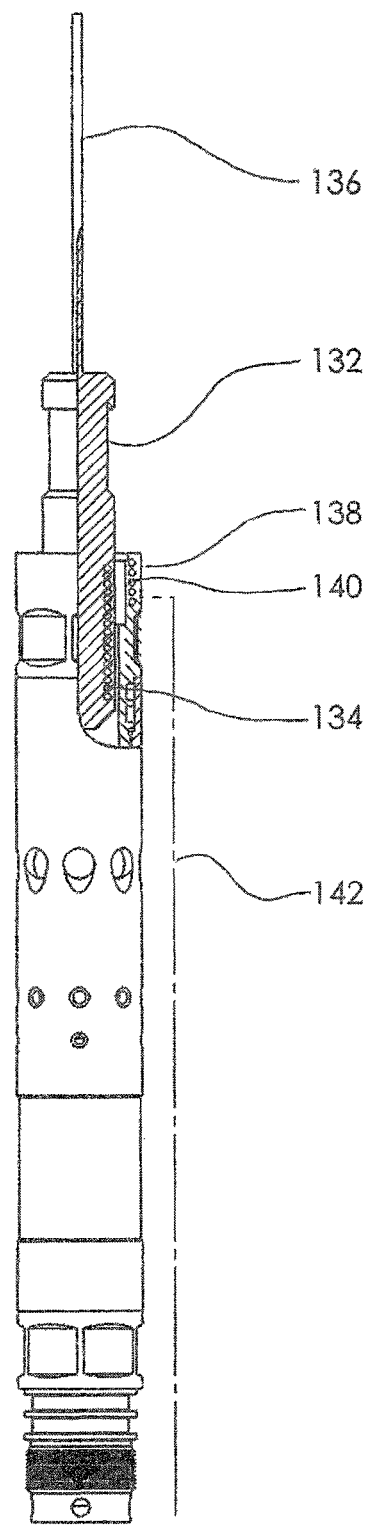
FIG. 13 comprises a partially sectioned view of an inductive coupler probe and communication coils in a valve assembly.

Now referring to FIG. 13, after the valve assembly has been run and locked into the well completion 10, an inductive coupler probe, including a probe housing 132 and probe inductive coupler coil 134 wrapped about a central longitudinal axis thereof near the lower end of the probe housing, is lowered by slick line 136 to sit in close proximity to an inductive coupler section 138 of the valve assembly, which in the illustrated embodiment is provided in the form of a sub threaded into the upper end of the main body of the valve housing nearest the surface and having a valve body inductive coupler coil 140 wrapped about the central axis of the valve housing's open upper end. So lowered, the probe 132 is located close enough to allow inductive communication to occur between the probe inductive coupler coil 134 and the valve body inductive coupler coil 140. In the illustrated embodiment, the probe is lowered to nest within the open upper end of the valve housing defined by the sub containing the valve body inductive coupler coil 140 to establish inductive energy transfer between the coils with the probe inductive coil positioned within the valve housing inductive coil. As shown, the coils may each be incorporated into the respective bodies on which they are supported, the probe inductive coil being embedded beneath the surface of the probe housing adjacent and proximate the periphery thereof and the valve housing coil being embedded within the annular wall defining the outer periphery of the hollow sub at the open upper end of the valve housing adjacent and proximate the inner periphery of this annular wall.

The inductive coupler is used to couple data from a downhole gauge below the valve to a separate communications head above the valve, the gauge monitoring well conditions below the valve and being electronically linked to the valve body inductive coupler coil 140. The communication path from the valve inductive coupler coil 140 to the probe inductive coupler coil 134 allows data from different measurement devices below the valve, e.g. pressure or temperature gauges, to be communicated in real time to the surface of the completion.

The communication path from the probe inductive coupler 134 to the valve inductive coupler 140 also allows data or instructions from the surface to be transmitted down hole to the drive section 43. This communication mechanism allows data to be transferred in real time across the shut in tool valve.

This data will be used to re-program the controller with a new set of open and close directions or to instruct the valves control circuit to initiate an open or a close sequence in real time. This allows the operator of the valve to read in real time, the measurement data from the conditions monitored below the valve to instruct or control, in real time, the valve to perform an open or close sequence.

Wiring, shown schematically in FIG. 13 by broken line 142, is coupled at one end to the valve body inductive coupler coil 140 and extends from the coupler-containing sub 138 externally along the valve housing to the opposite end for connection therebelow to an electronic gauge or monitoring system, such as the pressure recording apparatus 40 of FIG. 1, for monitoring conditions in the wellbore below the production tubing in which the valve is installed or to an electronic control system for controlling the valve, such as the microprocessor-based circuit card assembly 54 in the electronic carrier 60 of the universal drive assembly 43 of the preceding embodiments. The wiring thus provides electronic linking of the inductive coupler to the electronics below the valve, which may include one or more of a monitoring system and a control system, to transfer signals from the electronics to the coupler or vice versa, for example to forward signals indicative of well conditions below the valve to the communication head thereabove or to forward signals from the surface to the drive system to control operation of the valve.

It should be appreciated the inductive coupler may be incorporated into valves using arrangements other than the fluid-pressure controlled relative sliding collar and piston system described herein above to effect opening closing of the valve ports.

Alternate Embodiment Production Valve

Figure 14:
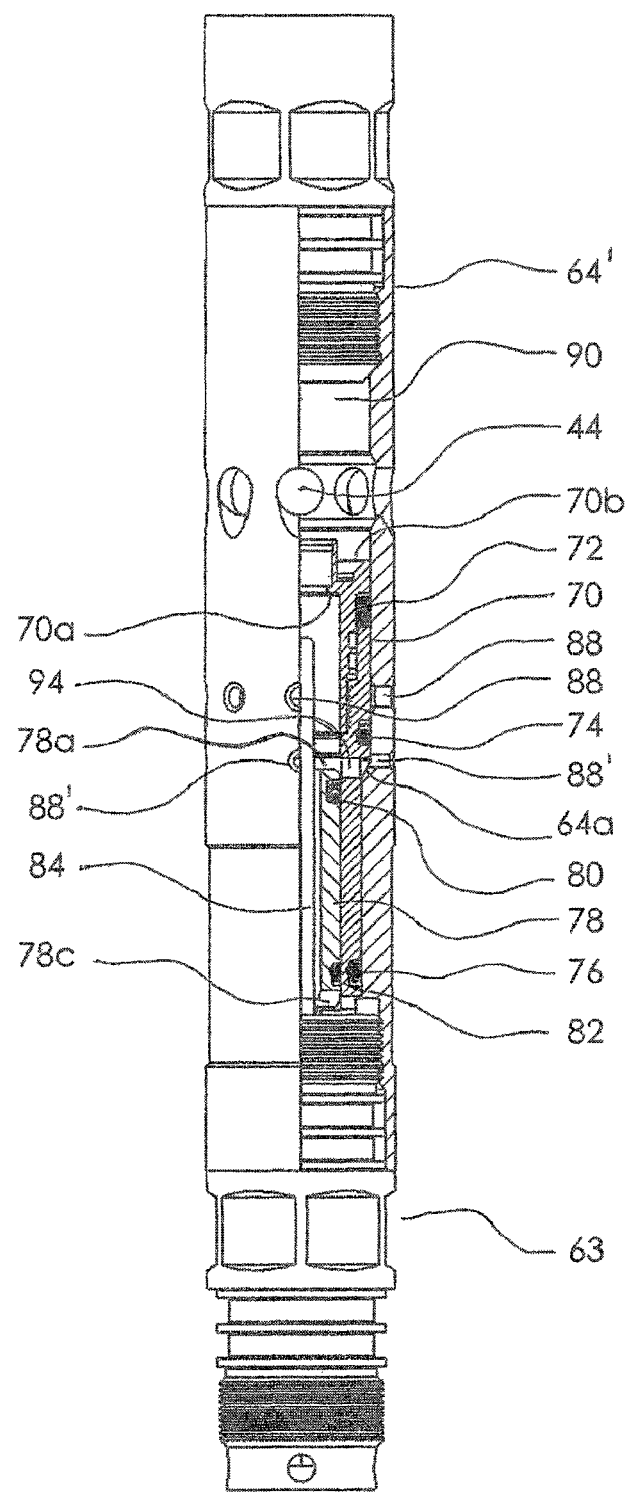
FIG. 14 comprises a partially sectioned view of an alternate embodiment production valve in its open condition.

FIG. 14 shows an alternate embodiment production valve that differs from the production valve of FIGS. 3 to 7 only in that the main ported housing 64' features a second set of the smaller ports 88' extending radially through the cylindrical peripheral wall of the main ported housing 64 at the obliquely sloped portion of the internal surface of this peripheral wall that defines the step 64a or change in the housing's internal diameter. As shown in the figure, with the sleeve in the fully retracted position corresponding to the fully open condition of the valve, the second set of smaller ports 88 are situated between the middle and rear main seals 74, 76 on the sleeve 70, which engage against smaller and larger diameter portions respectively of the housing's peripheral wall inner surface. As in the first embodiment production valve, the sleeve's outer diameter step or change is not gradual or obliquely sloped, but rather occurs within a cross-sectional plane of the sleeve that is normal to the sleeve's axis, providing an instant or immediate change in diameter and thus forming a right-angle shoulder. With the sleeve 70 in the fully retracted position, this right-angle shoulder is situated immediately above the sloped diameter change 64a in the housing wall inner surface and the second smaller ports 88' thereat, and each relief port 94 is in axial alignment with a respective one of the second smaller ports 88'.

As a result of this arrangement, the FIG. 14 embodiment differs from the first embodiment production valve in that the second smaller ports 88' in the main ported housing 64 are in fluid communication with the relief ports 94 in the sleeve through the annular space between the sleeve and housing wall at all times during operation of the valve, even with the valve fully open with the sleeve in the fully retracted position. In contrast, in the first embodiment production valve, the smaller housing ports 88 and the relief ports 94 are sealed off from one another with the sleeve retracted due to the positioning of the smaller housing ports 88 between the front and middle seals 72, 74 with the sleeve fully retracted. In the FIG. 14 embodiment, when the shuttle piston 78 is driven forward from its retracted position to close off the relief ports 94 between the front and rear piston gaskets 80, 82, the pressure of the production fluid entering the main ported housing 64 at the second smaller ports 88' exerts a net upward force on the sleeve and gasket assembly that counteracts downward force exerted on the sleeve 70 at the top thereof above the shuttle piston 78 by production fluid entering the main ported housing 64 through the larger ports 44. This reduces the force that needs to be exerted on the sleeve flange 70a by the motor-driven shuttle piston in order to move the sleeve 70 with the shuttle piston 78 toward the larger ports 44. The FIG. 7 embodiment production valve can thus be operated using a less powerful motor and battery combination than the first embodiment production valve.

Except for this earlier introduction of production fluid into the annular space between the sleeve and housing wall, the FIG. 14 embodiment production valve operates in the same manner as the first embodiment production valve. The FIG. 14 embodiment is shown with both the same smaller ports 88 as featured in the first embodiment production valve and the second set of smaller ports 88' formed nearer the drive section, and thereby reflects a prototype of the FIG. 14 embodiment that was produced as a modification of an earlier prototype reflective of the first embodiment. However, a production valve having the second set 88, of these two sets of sleeve control ports, and lacking the port set 88 situated further up the larger diameter portion of the housing interior between the front and middle main gaskets 72, 74 with the sleeve 70 in the retracted position, should function properly.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a valve housing having an open end and having a first housing port and a second housing port spaced along the valve housing, each housing port communicating with an exterior and interior of the valve housing;

a driven member supported within the valve housing;

a drive mechanism coupled to the driven member to effect displacement of the driven member along the valve housing toward and away from the first housing port into extended and retracted positions respectively; and a closure member slidably coupled to the driven member to be slidable relative thereto along the valve housing, the closure member having a closure member port communicating with an interior and exterior of the closure member;

the driven member and closure member arranged to close and open the closure member port during movement of the driven member toward the extended position and the retracted position respectively to respectively induce and relieve a pressure differential that, when induced, is exerted on the closure member by fluid entering the valve housing to slide the closure member along the driven member to a closed position in which the closure member closes the first housing port;

wherein a sealing arrangement associated with the driven and closure members is defined within the valve housing and arranged to first close off the closure member port between the driven member and the closure member under movement of the driven member from the retracted position toward the first housing port relative to the closure member and to subsequently close off the first housing port between the closure member and the valve housing under movement of the closure member toward the first housing port subsequent to closing of the closure member port.

2. The valve apparatus according to claim 1 wherein stops defined between the closure member and the driven member at spaced apart positions therealong limit relative sliding therebetween to establish movement of the driven member and closure member together after a predetermined amount of relative sliding therebetween in a single direction from engagement with either stop.

3. The valve apparatus according to claim 1 comprising a stop defined between the valve housing and the closure member to prevent movement of the closure member past the closed position.

4. The valve apparatus according to claim 1 wherein the sealing arrangement comprises inner annular seals disposed about an external periphery of the driven member at spaced locations therealong to seal against the closure member and outer annular seals disposed about an external periphery of the closure member at spaced locations therealong to seal against the valve housing, the closure member comprising a sleeve disposed about the driven member, movement of the driven member to situate the closure member port between engagement of adjacent inner annular seals between the driven member and the closure member effecting closing of the closure member port and movement of the closure member to situate the first housing port between engagement of adjacent outer annular seals between the closure member and the valve housing effecting closing of the first housing port.

5. The valve apparatus according to claim 1 wherein the closure member port is in fluid communication with the exterior of the valve housing through an opening in a wall of the valve housing with the driven member in the retracted position and the closure member port closed.

6. The valve apparatus according to claim 1 wherein an inner diameter of the valve housing and an outer diameter of the closure member are each stepped to increase in size toward the first housing port to increase a surface area for pressure of the fluid entering the valve housing through the second housing port to act on toward the first housing port with the closure port closed by the driven member.

7. The valve apparatus according to claim 6 wherein the closure member port is in fluid communication with the exterior of the valve housing through an opening in a wall of the valve housing with the driven member in the retracted position and the closure member port closed.

8. The valve apparatus according to claim 1 wherein an inner diameter of the valve housing and an outer diameter of the closure member are each stepped to increase in size away from the first housing port to increase a surface area for pressure of the fluid entering the valve housing through the open end thereof to act toward the first housing port with the closure member port closed by the driven member.

9. The valve apparatus according to claim 8 wherein the driven member has a passage defined therethrough to allow fluid flow from the open end thereof through the driven member to exert pressure toward the first housing port at the surface area with the closure port closed by the driven member.

10. The valve apparatus according to claim 1 in combination with a wellbore and production tubing which respectively define the fluid passage and the fluid delivery conduit, wherein the valve housing is supported within the production tubing for use of the valve apparatus as a shut-in valve for controlling flow of production fluid from the fluid passage defined by the wellbore through the fluid delivery conduit defined by the production tubing.

11. The valve apparatus according to claim 1 in combination with a wellbore and injection tubing which respectively define the fluid passage and the fluid delivery conduit, wherein the valve housing is supported within the injection tubing for use of the valve apparatus as an injection valve for controlling flow of injection fluid into the fluid passage defined by the wellbore through the fluid delivery conduit defined by the injection tubing.

12. The valve apparatus according to claim 1 wherein the driven member is arranged to support the closure member in the closed position with the driven member deployed to the extended position.

13. A valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a valve housing having an open end and having a first housing port and a second housing port spaced along the valve housing, each housing port communicating with an exterior and interior of the valve housing with the first housing port being adjacent the open end of the housing and the second housing port being on a side of the first housing port opposite the open end of the valve housing;

a driven member supported within the valve housing and comprising a piston displaceable therealong;

a drive mechanism coupled to the driven member within the valve housing on a side of the second housing port opposite the first housing port to effect displacement of the driven member along the valve housing toward and away from the first housing port into extended and retracted positions respectively; and a closure member comprising a sleeve disposed about and slidably coupled to the driven member for relative sliding between the closure member and the driven member along the valve housing, the closure member having a closure member port communicating with an interior and exterior of the closure member;

an inner diameter of the valve housing changing in size at a step defined between the first and second housing ports and an outer diameter of the closure member changing in size at a corresponding step, the sliding of the closure member along the valve housing moving the steps toward and away from one another to close and open an annular space between the closure member and the valve housing, the step of the closure member increasing a surface area for pressure of the fluid entering the valve housing to act on toward the first housing port with the closure member port closed, closing of the closure member port acting to seal off the annular space from a remainder of the interior of the valve housing to create a pressure differential between the remainder of the housing interior and the annular space which is open to the housing exterior through the second housing port, and opening of the closure member relieving the pressure differential, the pressure differential and the pressure of the fluid acting on the increased surface area acting to slide the closure member along the driven member to a closed position in which the closure member closes the first housing port;

driving of the driven member from the retracted position toward the extended position moving the driven member along the surrounding closure member to close off the closure member port to induce sliding of the closure member along the driven member Into the closed position, and driving of the driven member from the extended position toward the retracted position moving the driven member along the surrounding closure member to open the closure member port to facilitate withdrawal of the closure member from the closed position.

14. The valve apparatus according to claim 13 wherein a stop is defined between the closure member and the drive member to engage the closure and drive members for movement together away from the first housing port after sufficient movement of the drive member from the extended position toward the retracted position with the closure member in the closed position to open the closure member port.

15. The valve apparatus according to claim 13 wherein the inner diameter of the valve housing and the outer diameter of the closure member, across the step and the corresponding step respectively, each increase in size toward the first housing port and the increased surface area is defined within the annular space, whereby the pressure exerted on the increased surface area to force the closure member toward the first housing port being is provided by fluid entering the annular space through the second housing port.

16. The valve apparatus according to claim 15 wherein the closure member port is in fluid communication with the exterior of the valve housing through an opening in a wall of the valve housing with the driven member in the retracted position and the closure member port closed.

17. The valve apparatus according to claim 13 wherein the inner diameter of the valve housing and the outer diameter of the closure member, across the step and the corresponding step respectively, each increase in size away from the first housing port and the increased surface area is defined outside the annular space within the remainder of the housing interior on a side of the annular space opposite the first housing port, whereby the pressure that is exerted on the increased surface area to force the closure member toward the first housing port is provided by fluid entering the remainder of the housing interior through the open end of the valve housing, the driven member having a passage defined therethrough to allow the fluid from the open end of the valve housing to reach the increase surface area.

18. A combination of a probe and a down hole valve apparatus arranged for support within a fluid passage to control fluid flow between the fluid passage and a fluid delivery conduit having one end thereof disposed within the fluid passage to facilitate delivery of fluid between an interior and an exterior of the fluid passage via a pressure difference between the fluid passage and the fluid delivery conduit, the valve apparatus comprising:

a valve housing having an open end and at least one port communicating with an exterior and interior of the valve housing at a distance from the open end thereof;

a valve operating mechanism supported within the valve housing and operable to open and close the at least one port to control fluid flow between the interior of the valve housing and the surrounding fluid passage;

an electronic system situated on a side of the valve operating mechanism opposite the open end of the valve housing; and an inductive coil electrically coupled to the electronic system, supported proximate the open end of the valve housing in a fixed position relative thereto and wrapped about an axis thereof;

the probe being separate from the valve housing, being movable relative thereto and having a respective inductive coil wrapped about a respective axis of the probe at a respective end thereof for movement of the inductive coil with the probe, the respective end of the probe being sized to fit within the open end of the valve housing to facilitate selective insertion of the respective end of the probe into the interior of the valve housing through the open end thereof to situate the inductive coils proximate one another for inductive energy transfer therebetween.

19. The combination according to claim 18 wherein the electronic system comprises a control system coupled to the valve operating mechanism to control operation thereof in response to signals passed from the probe to the electronic system through the inductive coils.

20. The combination according to claim 18 wherein the electronic system comprises a monitoring system arranged to monitor conditions within the fluid passage and send signals to the probe indicative of the conditions through the inductive coils.

* * * * *